Patented Apr. 7, 1925.

1,532,225

UNITED STATES PATENT OFFICE.

SIDNEY M. CADWELL, OF LEONIA, NEW JERSEY, ASSIGNOR TO THE NAUGATUCK CHEMICAL COMPANY, A CORPORATION OF CONNECTICUT.

PROCESS FOR VULCANIZING RUBBER AND PRODUCT OBTAINED THEREBY.

No Drawing.   Application filed January 10, 1922.   Serial No. 528,278.

*To all whom it may concern:*

Be it known that I, SIDNEY M. CADWELL, a citizen of the United States, residing in Leonia, county of Bergen. State of New Jersey, have invented certain new and useful Improvements in Processes for Vulcanizing Rubber and Products Obtained Thereby, of which the following is a full, clear, and exact description.

This invention relates to processes for vulcanizing rubber and to products obtained thereby. It is more particularly directed to vulcanization by organic sulphur compounds.

This application is a continuation in part of my co-pending application Serial No. 359,807, filed February 19, 1920.

One object of the invention is to provide a process of the kind mentioned employing vulcanizing agents obtainable from inexpensive raw materials by a simple method. Another object of the invention is to provide a process in which vulcanizing agents of the kind mentioned may be readily compounded with rubber or similar material, which shall permit of the carrying out of vulcanization at ordinary temperatures in masses of rubber or in thin sheets while avoiding the generation of acids during the process of vulcanization, as, for example, takes place when sulphur chloride is used.

Another object of the invention is to provide a series of organic sulphur vulcanizing agents having a stable character, that is, adapted to remain as such without decomposition for a considerable period of time. Another object of the invention is to provide a series of products having generally desirable physical characteristics, such as high tensile strength, resistance to ageing, resistance to flexing, etc., and which shall be substantially free from the odor of the vulcanizing ingredients employed.

The invention accordingly consists broadly in the process, and product obtained therefrom, for treating rubber or similar material, which comprises subjecting the rubber to an organic sulphur compound as a vulcanizing agent containing the group

In this formula X represents any bivalent element or radical such as sulphur, oxygen, etc. In the table herein shown forming part of the specification this group appears joined to the element R which may or may not be part of another group. The group thus appears as $$\underset{X\ \ X}{RCSSCR,}$$

where R may be any element, preferably nitrogen, oxygen, sulphur or carbon attached to the carbon of the formula.

It is to be noted that the group formula represents generally derivatives of carbon oxy sulphide or carbon disulphide. They may be conveniently designated as disulphides.

It will be understood that the invention is not limited to the species shown in the accompanying table, and that by substituting other elements than nitrogen, carbon, oxygen and sulphur therein shown attached to the carbon of the formula for the symbol R, various other species may be formulated falling within the scope of the invention.

Although the various species disclosed are represented as symmetrical, it will be understood that unsymmetrical species also fall within the limits of the invention.

The table is:—

| 1. $\underset{S\ \ S}{OCSSCO}$ | 2. $\underset{O\ \ O}{OCSSCO}$ | 3. $\underset{NR\ NR}{OCSSCO}$ | 4. $\underset{CR_2\ CR_2}{OCSSCO}$ |
|---|---|---|---|
| 5. $\underset{S\ \ S}{CCSSCC}$ | 6. $\underset{O\ \ O}{CCSSCC}$ | 7. $\underset{NR\ NR}{CCSSCC}$ | 8. $\underset{CR_2\ CR_2}{CCSSCC}$ |
| 9. $\underset{S\ \ S}{SCSSCS}$ | 10. $\underset{O\ \ O}{SCSSCS}$ | 11. $\underset{NR\ NR}{SCSSCS}$ | 12. $\underset{CR_2\ CR_2}{SCSSCS}$ |
| 13. $\underset{S\ \ S}{NCSSCN}$ | 14. $\underset{O\ \ O}{NCSSCN}$ | 15. $\underset{NR\ NR}{NCSSCN}$ | 16. $\underset{CR_2\ CR_2}{NCSSCN}$ |

In general the various species set forth above are able to vulcanize both hot and cold and may be used for such vulcanization in thick masses of rubber, in thin sheets or in cements. The general procedure in vulcanizing employing the various species is as follows: 100 parts of rubber, 20 parts of a compound containing a combined metal M', 2 parts of an amine, and 10 parts of the vulcanizing agent are mixed. If hot vulcanization is employed, the usual temperatures or lower may be used for periods of 30 minutes or more to complete vulcanization. If cold vulcanization is desired the mixed materials may be allowed to stand at ordinary temperature for a week or less when vulcanization is complete. The procedure just given may be employed with thin or thick masses of rubber and in the case of cements where a solvent is used with the mixture, the procedure after mixing and evaporation of the solvent, is substantially identical with that employed for thin masses of rubber.

In general the use of bases, particularly amines, is preferred in connection with members of this group. The action of the addition of primary and secondary amines to materials of this class has been found to be as follows:—The acceleration by aliphatic amines is greatest when approximately three-quarters molecular weight of the amine on the basis of the carbon disulphide content of the thiol salt is used. An excess of primary aliphatic amines retards the cure considerably. An excess of secondary aliphatic amine retards the cure less. The greater the amount of primary aromatic amine added, the greater the acceleration. Tertiary amines have substantially no effect. Dibenzyl amine has given excellent results in the acceleration of vulcanization according to the invention. Sodium hydroxide also accelerates the action of disulphides. The combined metal M' may be added as the oxide or as any other desired compound, such as the xanthogenate, dithiobenzoate, acetate or in other forms of combination. For cold vulcanization the combined metals which have been found to be suitable are: zinc or mercury, preferably in the mercuric form. Of these two, zinc is preferred. If vulcanization above ordinary temperatures is carried out the preferred metals are the following: zinc, mercury, preferably in the mercuric form, lead, preferably in the plumbous form, cadmium, copper, preferably in the cupric form, arsenic, preferably in the arsenous form, magnanese, preferably in the manganous form.

*Species 1.*

As an example of the specific procedure employing members of this group, 100 parts of rubber are mixed by milling with 20 parts of zinc oxide, 2 parts of aniline and 10 parts of O-normal butyl thiocarbonic acid disulphide. The mixture is allowed to stand at room temperature for several days, at the end of which time vulcanization is complete. If the same mixture is placed in a mold under steam pressure at approximately 40 pounds per square inch vulcanization is accomplished in approximately 30 minutes. Hot vulcanization may be continued for longer periods if desired without harmful effects. The time required for vulcanization is of course dependent on the thickness of the rubber and will vary with different kinds of rubber.

By varying the amine various results may be produced and the temperature necessary for vulcanization may be likewise varied.

By the term low temperature as here employed is meant temperatures ranging from room temperature or lower to 100° C.

The above vulcanizing agent is a preferred member of a group of compounds which are able to produce approximately equally good results. Among other members of this species may be mentioned the following:

O-methyl thiocarbonic acid disulphide

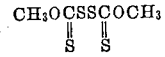

O-ethyl thiocarbonic acid disulphide

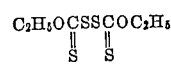

O-amyl thiocarbonic acid disulphide

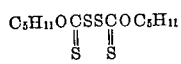

Other thiocarbonic acid disulphides containing other alkyl or equivalent groups will also cause vulcanization in a similar manner, but these substances will naturally vary in their effects according to the nature of the alkyl or similar groups, and they may be selected for the requirements of a particular case.

By the use of the above mentioned vulcanizing agents, vulcanization is accomplished in a rapid and efficient manner, and rubber products are produced having high tensile strength, good ageing qualities and very little odor. The fact that many of the members of the above species are oily substances renders their addition to the compounding ingredients on the mill an easy operation and results in a very uniform and efficient mixture. The raw materials from which the substances are prepared are moreover cheap and the process very simple.

It is therefore evident that the objects of the invention above enumerated are thus achieved.

A particular merit of these vulcanizing ingredients is that they will produce vulcanization, and that they will do so without regenerating an acid, which is an advantage not possessed by sulphur chloride for this agent generates hydrochloric acid. They may be added directly to the compounding ingredients on the mixing mill which is impracticable with sulphur chloride.

Species 2.

The following member of this species has been employed to give good results in connection with the process included in the invention:—

Dibutyloxyester of carbonyldisulphide

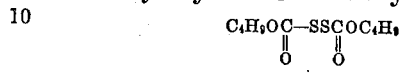

Species 5.

The following members of this species have been employed to give good results in connection with the process included in the invention:—

Thiobenzoyldisulphide $$C_6H_5C-S-SCC_6H_5$$
$$\phantom{xx}\|\phantom{xxx}\|$$
$$\phantom{xx}S\phantom{xxx}S$$

Thiophenylacetyldisulphide $$C_6H_5CH_2C-S-SCCH_2C_6H_5$$
$$\phantom{xxxx}\|\phantom{xxx}\|$$
$$\phantom{xxxx}S\phantom{xxx}S$$

Thioacetyldisulphide $$CH_3C-SSCCH_3$$
$$\phantom{x}\|\phantom{xxx}\|$$
$$\phantom{x}S\phantom{xxx}S$$

It will be observed that members of this species are capable of rapid vulcanization when employed in quantities varying from 5 to 10 parts to 100 parts of rubber. Thiobenzoyldisulphide will provide a vulcanized product having a sweet odor.

Species 6.

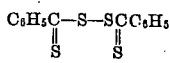

The following members of this species have been employed to give good results in connection with the process included in the invention:—

Acetyldisulphide

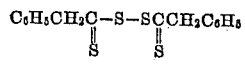

Benzoyldisulphide

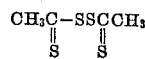

Species 9.

· SCSSCS
 ‖ ‖
 S S

The following member of this species has been employed to give good results in connection with the process included in the invention:—

Dibutylthiolester of thioncarbonyldisulphide

Species 13.

NCSSCN
‖ ‖
S S

Members of this class include:
Dimethyldiphenylthiuramdisulphide

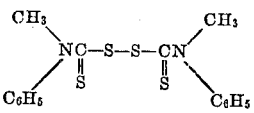

Diethyldiphenylthiuramdisulphide

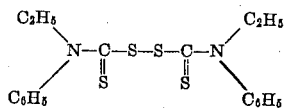

Diparamethylphenylenedimethylthiuramdisulphide

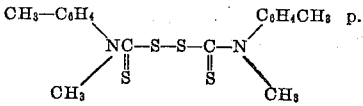

Species 14.

The following member of this species has been employed to give good results in connection with the process included in the invention:—

Tetraethylcarbamyldisulphide

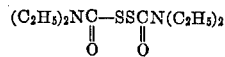

The members of the various species mentioned will vulcanize slowly either at low or high temperatures without added amines. In general added amines accelerate vulcanization with these vulcanizing agents.

As an alternative of the examples given for the vulcanization of rubber above, the following mixture is representative of a mass vulcanizing at either high or low temperatures: 100 parts of rubber, 10 parts of zinc oxide, 2 parts of dibenzyl amine, 10 parts of O-normal butyl thiocarbonic acid disulphide. This mixture is preferably vulcanized at elevated temperatures, that is at say 40 lbs. steam pressure. At such temperature satisfactory vulcanization occurs in approximately 60 minutes. For low temperature vulcanization the mixture given above if allowed to stand for approximately one week at ordinary temperature will vulcanize satisfactorily.

The accelerators which may be employed with vulcanizing agents of the type herein described include both inorganic and organic materials, preferably bases, such as amines, hydroxides, oxides, etc.

The stocks prepared in accordance with the procedures outlined above employing material of the class herein described have in general the various advantages of sulphur cured stocks. Due to the low content of sulphur which is secured through the use of materials of this class, and particularly due to the fact that substantially all of this sulphur is present in the rubber in the combined state, as has been shown upon analysis of these stocks, the stocks are free from bloom and have excellent ageing properties. Using materials herein recited with accelerators of the kind mentioned, air cured translucent stocks may be obtained.

As many apparently widely different embodiments of this invention may be made without departing from the spirit thereof, it will be understood that I do not intend to limit myself to the specific embodiment herein set forth except as indicated in the appended claims.

Having thus described my invention, what I claim and desire to protect by Letters Patent is:

1. A process for treating rubber, which comprises subjecting the rubber to an organic sulphur compound as a vulcanizing agent characterized by the group

and vulcanizing the rubber.

2. A process for treating rubber, which comprises subjecting the rubber to an organic sulphur compound as a vulcanizing agent characterized by the group

and vulcanizing the rubber.

3. A process for treating rubber, which comprises subjecting the rubber to an organic sulphur compound as a vulcanizing agent characterized by the group RCSSCR,

and vulcanizing the rubber.

4. A process for treating rubber, which comprises subjecting the rubber to an organic sulphur compound as a vulcanizing agent characterized by the group RCSSCR,

and vulcanizing the rubber.

5. A process for treating rubber, which comprises subjecting the rubber to an organic sulphur compound as a vulcanizing agent characterized by the group CSSC

and an amine, and vulcanizing the rubber.

6. A process for treating rubber, which comprises subjecting the rubber to an organic sulphur compound as a vulcanizing agent characterized by the group CSSC

and an amine, and vulcanizing the rubber.

7. A process for treating rubber, which comprises subjecting the rubber to an organic sulphur compound as a vulcanizing agent characterized by the group RCSSCR,

and an amine, and vulcanizing the rubber.

8. A process for treating rubber, which comprises subjecting the rubber to an organic sulphur compound as a vulcanizing agent, characterized by the group RCSSCR,

and an amine, and vulcanizing the rubber.

9. A process for treating rubber, which comprises subjecting the rubber to an organic sulphur compound as a vulcanizing agent characterized by the group CSSC,

in the presence of a combined metal M', and vulcanizing the rubber.

10. A process for treating rubber, which comprises subjecting the rubber to an organic sulphur compound as a vulcanizing agent characterized by the group CSSC,

in the presence of a combined metal M', and vulcanizing the rubber.

11. A process for treating rubber, which comprises subjecting the rubber to an organic sulphur compound as a vulcanizing agent characterized by the group RCSSCR,

in the presence of a combined metal M', and vulcanizing the rubber.

12. A process for treating rubber, which comprises subjecting the rubber to an organic sulphur compound as a vulcanizing agent characterized by the group RCSSCR,

in the presence of a combined metal M', and vulcanizing the rubber.

13. A process for treating rubber which comprises subjecting the rubber to an organic sulphur compound as a vulcanizing agent comprising the group OCSSCO,

and vulcanizing the rubber.

14. A process for treating rubber which comprises subjecting the rubber to an organic sulphur compound as a vulcanizing agent characterized by the group CSSC.

15. A process for treating rubber which comprises subjecting the rubber to an organic sulphur compound as a vulcanizing agent characterized by the group $$RCSSCR$$
$$\overset{\|}{X}\ \overset{\|}{X}$$

in the presence of combined zinc, and vulcanizing the rubber.

16. A process for treating rubber which comprises subjecting the rubber to an organic sulphur compound as a vulcanizing agent comprising the group $$OCSSCO,$$
$$\overset{\|}{S}\ \overset{\|}{S}$$

in the presence of combined zinc, and vulcanizing the rubber.

17. A process for treating rubber which comprises subjecting the rubber to an organic sulphur compound as a vulcanizing agent having the formula $$C_4H_9OCSSCOC_4H_9,$$
$$\overset{\|}{X}\ \overset{\|}{X}$$

and vulcanizing the rubber.

18. A process for treating rubber which comprises subjecting the rubber to an organic sulphur compound as a vulcanizing agent having the formula $$C_4H_9OCSSCOC_4H_9,$$
$$\overset{\|}{S}\ \overset{\|}{S}$$

and vulcanizing the rubber.

19. A process for treating rubber which comprises subjecting the rubber to an organic sulphur compound as a vulcanizing agent having the formula $$C_4H_9OCSSCOC_4H_9,$$
$$\overset{\|}{S}\ \overset{\|}{S}$$

in the presence of an amine, and vulcanizing the rubber.

20. A process for treating rubber which comprises subjecting the rubber to an organic sulphur compound as a vulcanizing agent having the formula $$C_4H_9OCSSCOC_4H_9,$$
$$\overset{\|}{S}\ \overset{\|}{S}$$

in the presence of an aromatic amine, and vulcanizing the rubber.

21. A process for treating rubber which comprises subjecting the rubber to an organic sulphur compound as a vulcanizing agent having the formula $$C_4H_9OCSSCOC_4H_9,$$
$$\overset{\|}{S}\ \overset{\|}{S}$$

in the presence of a combined metal M', and vulcanizing the rubber.

22. A process for treating rubber which comprises subjecting the rubber to an organic sulphur compound as a vulcanizing agent having the formula $$C_4H_9OCSSCOC_4H_9,$$
$$\overset{\|}{S}\ \overset{\|}{S}$$

in the presence of combined zinc, and vulcanizing the rubber.

23. A process for treating rubber which comprises subjecting the rubber to an organic sulphur compound as a vulcanizing agent having the formula $$C_4H_9OCSSCOC_4H_9,$$
$$\overset{\|}{S}\ \overset{\|}{S}$$

in the presence of an amine and combined zinc, and vulcanizing the rubber.

24. A process for treating rubber which comprises subjecting the rubber to an organic sulphur compound as a vulcanizing agent having the formula $$C_4H_9OCSSCOC_4H_9,$$
$$\overset{\|}{S}\ \overset{\|}{S}$$

in the presence of aniline and combined zinc, and vulcanizing the rubber.

25. A vulcanized rubber derived from rubber combined with an organic sulphur compound as a vulcanizing agent characterized by the group $$CSSC.$$
$$\overset{\|}{X}\ \overset{\|}{X}$$

26. A vulcanized rubber derived from rubber combined with an organic sulphur compound as a vulcanizing agent characterized by the group $$CSSC.$$
$$\overset{\|}{S}\ \overset{\|}{S}$$

27. A vulcanized rubber derived from rubber combined with an organic sulphur compound as a vulcanizing agent characterized by the group $$RCSSCR.$$
$$\overset{\|}{X}\ \overset{\|}{X}$$

28. A vulcanized rubber derived from rubber combined with an organic sulphur compound as a vulcanizing agent characterized by the group $$RCSSCR.$$
$$\overset{\|}{S}\ \overset{\|}{S}$$

29. A vulcanized rubber derived from rubber combined with an organic sulphur compound as a vulcanizing agent characterized by the group $$CSSC$$
$$\overset{\|}{X}\ \overset{\|}{X}$$

and an amine.

30. A vulcanized rubber derived from rubber combined with an organic sulphur compound as a vulcanizing agent characterized by the group $$CSSC$$
$$\overset{\|}{S}\ \overset{\|}{S}$$

and an amine.

31. A vulcanized rubber derived from rubber combined with an organic sulphur compound as a vulcanizing agent characterized by the group

and an amine.

32. A vulcanized rubber derived from rubber combined with an organic sulphur compound as a vulcanizing agent characterized by the group

and an amine.

33. A vulcanized rubber derived from rubber combined with an organic sulphur compound as a vulcanizing agent characterized by the group

in the presence of a combined metal M'.

34. A vulcanized rubber derived from rubber combined with an organic sulphur compound as a vulcanizing agent characterized by the group

in the presence of a combined metal M'.

35. A vulcanized rubber derived from rubber combined with an organic sulphur compound as a vulcanizing agent characterized by the group

in the presence of a combined metal M'.

36. A vulcanized rubber derived from rubber combined with an organic sulphur compound as a vulcanizing agent characterized by the group

in the presence of a combined metal M'.

37. A vulcanized rubber derived from rubber combined with an organic sulphur compound as a vulcanizing agent comprising the group

38. A vulcanized rubber derived from rubber combined with an organic sulphur compound as a vulcanizing agent characterized by the group

in the presence of combined zinc.

39. A vulcanized rubber derived from rubber combined with an organic sulphur compound as a vulcanizing agent characterized by the group

in the presence of combined zinc.

40. A vulcanized rubber derived from rubber combined with an organic sulphur compound as a vulcanizing agent comprising the group

in the presence of combined zinc.

41. A vulcanized rubber derived from rubber combined with an organic sulphur compound as a vulcanizing agent having the formula

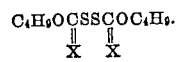

42. A vulcanized rubber derived from rubber combined with an organic sulphur compound as a vulcanizing agent having the formula

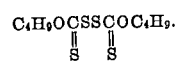

43. A vulcanized rubber derived from rubber combined with an organic sulphur compound as a vulcanizing agent having the formula

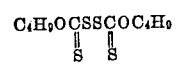

in the presence of an amine.

44. A vulcanized rubber derived from rubber combined with an organic sulphur compound as a vulcanizing agent having the formula

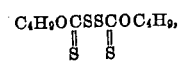

in the presence of an aromatic amine.

45. A vulcanized rubber derived from rubber combined with an organic sulphur compound as a vulcanizing agent having the formula

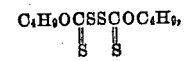

in the presence of a combined metal M'.

46. A vulcanized rubber derived from rubber combined with an organic sulphur compound as a vulcanizing agent having the formula

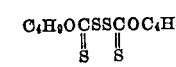

in the presence of combined zinc.

47. A vulcanized rubber derived from rubber combined with an organic sulphur compound as a vulcanizing agent having the formula

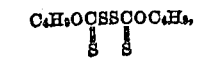

48. A vulcanized rubber derived from rubber combined with an organic sulphur compound as a vulcanizing agent having the formula $$\underset{\underset{S}{\|}}{C_4H_9OCSSCOC_4H_9}\underset{\underset{S}{\|}}{}$$

in the presence of aniline and combined zinc.

49. A process for treating rubber which comprises subjecting the rubber to an organic sulphur compound as a vulcanizing agent characterized by the group $$\underset{\underset{X}{\|}}{CSSC}\underset{\underset{X}{\|}}{}$$

in the presence of an amine and a combined metal M', and vulcanizing the rubber.

50. A process for treating rubber which comprises subjecting the rubber to an organic sulphur compound as a vulcanizing agent characterized by the group $$\underset{\underset{S}{\|}}{CSSC}\underset{\underset{S}{\|}}{}$$

in the presence of an amine and a combined metal M', and vulcanizing the rubber.

51. A process for treating rubber which comprises subjecting the rubber to an organic sulphur compound as a vulcanizing agent characterized by the group $$\underset{\underset{S}{\|}}{CSSC}\underset{\underset{S}{\|}}{}$$

in the presence of an amine and combined zinc, and vulcanizing the rubber.

52. A process for treating rubber which comprises subjecting the rubber to an organic sulphur compound as a vulcanizing agent characterized by the group $$\underset{\underset{S}{\|}}{OCSSCO}\underset{\underset{S}{\|}}{}$$

in the presence of an amine and a combined metal M', and vulcanizing the rubber.

53. A vulcanized rubber derived from rubber combined with an organic sulphur compound as a vulcanizing agent characterized by the group $$\underset{\underset{X}{\|}}{CSSC}\underset{\underset{X}{\|}}{}$$

in the presence of an amine and a combined metal M'.

54. A vulcanized rubber derived from rubber combined with an organic sulphur compound as a vulcanizing agent characterized by the group $$\underset{\underset{S}{\|}}{CSSC}\underset{\underset{S}{\|}}{}$$

in the presence of an amine and a combined metal M'.

55. A vulcanized rubber derived from rubber combined with an organic sulphur compound as a vulcanizing agent characterized by the group $$\underset{\underset{S}{\|}}{CSSC}\underset{\underset{S}{\|}}{}$$

in the presence of an amine and combined zinc.

56. A vulcanized rubber derived from rubber combined with an organic sulphur compound as a vulcanizing agent characterized by the group $$\underset{\underset{S}{\|}}{OCSSCO}\underset{\underset{S}{\|}}{}$$

in the presence of an amine and a combined metal M'.

Signed at New York, New York, this 7 day of January, 1922.

SIDNEY M. CADWELL.